United States Patent Office 3,002,031
Patented Sept. 26, 1961

3,002,031
HALOGENATED ORGANIC COMPOUNDS
Murray Hauptschein, Glenside, and Milton Braid, Philadelphia, Pa., assignors to Pennsalt Chemicals Corporation, Philadelphia, Pa., a corporation of Pennsylvania
No Drawing. Filed Jan. 30, 1959, Ser. No. 790,080
10 Claims. (Cl. 260—653.1)

This invention relates to fluorinated organic compounds and more particularly is concerned with low molecular weight polymers, particularly those which are liquid at room temperature, prepared from perfluoro olefins.

Low polymers (usually referred to as telomers) of perfluoroolefins are known to be non-flammable and to have superior chemical and thermal stability. As liquids, such telomers may be employed e.g. as lubricants, hydraulic fluids, damping fluids etc. in applications involving exposure to relatively high temperature and/or exposure to chemical attack, which would cause conventional hydrocarbon oils to degrade rapidly. As waxes and low melting solids, such highly fluorinated telomers may be employed e.g. as potting compounds for sensitive components such as electrical elements in applications where exposure to corrosive chemical conditions is involved.

Previously suggested telomers prepared from perfluoroolefins include, for example, telomers prepared from tetrafluoroethylene, e.g. telomers of the type $CF_3(CF_2CF_2)_nF$. Such telomers of tetrafluoroethylene, while of superior chemical and thermal stability, have the decided disadvantage that they tend to undergo an abrupt transition from light, mobile liquids at low molecular weights to solids. They do not form liquids in the medium and high viscosity range suitable for use as lubricants and the like.

Another class of telomers of perfluoroolefins, namely telomers of perfluoropropene and similar olefins are described and claimed in copending application Serial No. 701,995, filed December 11, 1957. Such telomers have excellent chemical and thermal stability and in addition have the important property of forming a series of liquids of gradually increasing viscosity as the chain length of the telomer increases rather than undergoing an abrupt transition from light, mobile liquids to solids. Such telomers of perfluoropropene and related perfluoroolefins are, however, relatively expensive because of the relatively high expense of the perfluoropropene monomer and also because of the rather long reaction periods required to produce the telomer. The homotelomers of perfluoropropene likewise have the disadvantage that they are not readily convertible into desired derivatives such as perfluorocarboxylic acids, esters, amides and the like by presently known techniques.

In accordance with the present invention it has now been found that cotelomers of tetrafluoroethylene and perfluoroolefins having from 3 to 6 carbon atoms in which the ratio of tetrafluoroethylene olefin units in the cotelomer chain to units derived from the other olefin is in the range of from 7:1 to 1:4 and preferably from 5:1 to 1:2 do not have the disadvantage characteristic of tetrafluoroethylene telomers of undergoing abrupt transition from light liquids to relatively high melting solids. At the same time such cotelomers are reduced in cost relative, for example to homotelomers of perfluoropropene since they employ predominately, or at least a substantial proportion, of the relatively less expensive olefin tetrafluoroethylene, and because they are likewise somewhat easier to prepare. The cotelomers of the invention have the excellent chemical and thermal stability characteristic of telomers prepared from perfluoroolefins with the important advantage that they form a series of liquids and relatively low melting solids which increase gradually in viscosity and melting point as the chain length of the cotelomer increases. They provide, particularly those containing only fluorine and carbon, dielectric liquids of outstanding properties at both low and high frequencies. The cotelomer iodides of the invention have the further advantage that they tend to terminate in a $-CF_2CF_2I$ end group rather than a secondary

end group characteristic of homotelomers prepared from the olefin perfluoropropene. As will be explained more in detail hereafter a $-CF_2CF_2I$ end group permits the telomers of the invention to be converted more readily into derivatives such as carboxylic acids, esters, amides and the like.

While the invention does not depend upon any particular theory relating the structure of the cotelomers of the invention to the desirable properties which they display, it is believed that the desired gradual, rather than abrupt, increase in melting point and viscosity as the chain length increases results from the branched chains which are introduced into the cotelomer chain by the introduction of controlled amounts of perfluoropropene or similar olefins. Homotelomers of tetrafluoroethylene and cotelomers lacking such chain branching, are believed to form highly oriented spatial arrangements in which the telomer chains tend to arrange in crystal-like structures. It is believed that the branched chains introduced by the perfluoropropene or similar olefin tends to sterically hinder the orientation of the telomer chains in a crystalline pattern, thus preventing a rapid transition from light liquids to solids as the chain length increases.

According to preferred procedures, the cotelomers of the invention are prepared by reacting a mixture of tetrafluoroethylene and the other perfluoroolefin of 3 to 6 carbon atoms with a telogen iodide of the formula R'I where R' is selected from the class consisting of perfluoro and perfluorochloro radicals having from 1 to 10 carbon atoms and preferably from 1 to 6 carbon atoms, R' being preferably a perfluoroalkyl or a perfluorochloroalkyl radical. As used herein, the term perfluoro means containing only fluorine and carbon, while perfluorochloro means containing only fluorine, chlorine and carbon.

Perfluoroolefins particularly suitable for cotelomerizing with tetrafluoroethylene to produce the cotelomers of the invention are those of the formula $RCF=CF_2$ where R is a perfluoroalkyl radical having from one to four carbon atoms, particularly perfluoropropene, $CF_3CF=CF_2$ and perfluorobutene, $CF_3CF_2CF=CF_2$. Mixtures of two or more perfluoroolefins having from 3 to 6 carbon atoms may also be cotelomerized with tetrafluoroethylene if desired, such as a mixture of perfluoropropene and perfluorobutene. In such cases the cotelomer chain contains 3 or more different types of olefin units. It is to be understood that reference to the other perfluoroolefin as used herein is intended to include such mixtures.

Particularly preferred telogen iodides are perfluoro iodides such as $C_2F_5I$ or $CF_3CFICF_3$ since the resulting perfluoro telomer iodides may then be readily converted into completely fluorinated telomers by replacement of the terminal iodine atom with fluorine. Perfluorochloro telogen iodides on the other hand are somewhat lower in cost, and thus are sometimes preferred for this reason, particularly those having only 1 or 2 chlorine atoms which thus introduce only a small proportion of chlorine into the telomer.

Typical specific telogen iodides suitable for preparing the cotelomers of the invention include for example:

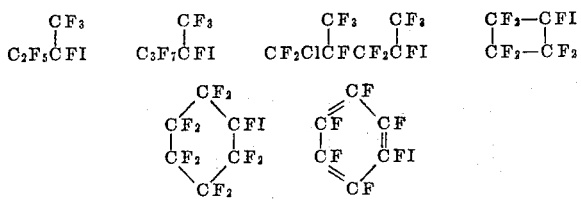

Reaction between the mixture of tetrafluoroethylene, the other olefin, and the telogen iodide is preferably carried out using heat alone, i.e. in the absence of initiators such as ultraviolet light or peroxides, at temperatures ranging from 130 to 250° C. and preferably from 140 to 220° C.

The reaction is preferably carried out under superatmospheric pressures ranging from at least 50 lbs./in.$^2$ gage and preferably at least 100 lbs./in.$^2$ gage to any practical limit, e.g. 50,000 lbs./in.$^2$ gage. Reaction pressures in the range of from 500 to 10,000 lbs./in.$^2$ gage are usually preferable.

Reaction time is whatever is required to give satisfactory conversions and the optimum reaction time will depend upon the particular telogen employed, on the temperature, and on other reaction variables. The reaction time is not critical in the sense that it determines whether or not the reaction will go, but it is an important variable in determining the conversion obtained and the molecular size of the product. In general, the longer the reaction time, the greater proportion of high molecular weight product, and the greater the conversion. In general, the reaction time may be as short as ½ hour and in some cases desirably as long as 1 day. Usually, it will range from 1 hour to 10 hours.

The proportion of total olefin to telogen is not critical with respect to whether or not the reaction will take place, but in general shorter reaction times will result from the use of higher proportions of tetrafluoroethylene. Generally, the molar ratio of total olefin (i.e. tetrafluoroethylene plus the other perfluoroolefin) to telogen in the reaction mixture should be between about 1 to 20 and preferably between 3 and about 10.

The molar ratio of tetrafluoroethylene to the other olefin in the reaction mixture determines to a large extent the ratio of tetrafluoroethylene units to units derived from the other olefin in the cotelomer product. In general, the higher the molar proportion of tetrafluoroethylene in the reaction mixture the higher will be its proportion in the cotelomer product, and conversely.

Since tetrafluoroethylene adds to the cotelomer chain more readily than the other olefin, e.g. perfluoropropene, the proportion of tetrafluoroethylene in the cotelomer chain will generally be considerably higher than its proportion in the reaction mixture. For example, a 1:1 molar ratio of tetrafluoroethylene to the other olefin in the reaction mixture may typically result in a 5:1 ratio of tetrafluoroethylene to the other olefin in the cotelomer chain. The molar ratio of tetrafluoroethylene to the other olefin in the reaction mixture should generally be in the range of from 2:1 to 1:8 and more usually from 1:1 to 1:5 in order to obtain the desired ratio of tetrafluoroethylene units to the other olefin in the cotelomer chain.

The cotelomer iodides produced by the above described procedures are open chain compounds which may be represented by the general formula:

$$R'[U]_m[CF_2CF_2]_nI$$

where R' is as defined above, where U is a divalent radical derived from the other olefin and where $n$ and $m$ are integers of the series 1, 2, 3, 4 etc.

Where the other olefin is an olefin of the formula RCF=CF$_2$ as is preferred the cotelomers may be represented by the general formula

The structure indicated by the above formulae is not intended to imply any more than the cotelomer has R' and I end groups enclosing a cotelomer chain containing tetrafluoroethylene (CF$_2$CF$_2$) units and units derived from the other olefin connected to one another in a straight chain. The tetrafluoroethylene units (CF$_2$CF$_2$) and the units [U] derived from the other olefin are shown as separately grouped merely for the sake of simplicity. Actually, the different olefin units may alternate with one another in random order, both singly and in small groups. The cotelomer chain may begin with either olefin unit at random, but will generally preferentially terminate with a tetrafluoroethylene (CF$_2$CF$_2$) unit, as shown by the ultraviolet spectra of the cotelomers prepared in the following examples which in isooctane solution is about 270 mμ (characteristic of the primary CF$_2$I end groups) rather than at 283 mμ, the characteristic wave length for the secondary

In order to obtain cotelomer products which are liquid at normal or close to normal temperatures useful as lubricants, hydraulic fluids, damping fluids and the like, the value of $n+m$ in the above formula should range from about 3 to 40. Normally liquid oils of the most useful range of viscosity are generally obtained when the cotelomer contains from about 4 to 12 total olefin units, i.e. when the value of $n+m$ in the above formula is in the range of from about 4 to 12.

The telomerization reaction inherently produces a mixture of cotelomers of varying chain lengths and corresponding varying molecular weights. The average chain length and the spread of molecular weights produced by the telomerization reaction can be controlled within limits as discussed above by varying the reaction time, reaction temperature and other reaction variables. If desired, individual compounds can be separated from the mixture, e.g. by careful fractional distillation, or the raw mixture of cotelomers can be separated into fractions of narrower ranges of molecular weight having desired viscosity or other properties. It is intended that the appended claims cover both the individual compounds and mixtures of the individual compounds.

As pointed out previously, the molar ratio of tetrafluoroethylene units in the cotelomer chain to units derived from the other olefin, i.e. the $n:m$ ratio, should be in the range of from 7:1 to 1:4 and preferably from 5:1 to 1:2. Small amounts of perfluoropropene or similar olefin e.g. ten mole percent in the cotelomer chain do not significantly alter the undesirable tendency of tetrafluoroethylene units to change abruptly from light liquids to solids with increasing chain length. Increasing the proportion of perfluoropropene or similar olefin in the cotelomer chain tends to progressively improve the "liquidous range" (i.e. the range of molecular weights over which liquids or low melting solids are obtained) of the cotelomer, but more than about 80 mole percent of perfluoropropene or similar olefin does not further improve the "liquidous range" significantly.

The cotelomers having terminal iodine atoms have some utility in themselves as lubricants, hydraulic fluids and the like, and also useful for facile conversion into derivatives, e.g. carboxylic acids, esters, amides, amines etc. by first forming a halosulfate by reaction of the cotelomer iodide with chlorosulfonic acid and then further reacting the halosulfate as described in copending application Serial No. 735,702, filed May 16, 1958. For use as oils, however, it is generally preferred to replace the terminal iodine atom with chlorine or fluorine in order to produce cotelomers which are more stable to heat and chemical reagents.

Replacement of the terminal iodine atom with fluorine may be accomplished by treating the cotelomer iodide with fluorinating agents such as SbF$_5$, CoF$_3$, and fluorine at normal or slightly elevated temperatures such as from room temperature to 300° C. A preferred procedure is to fluorinate with $CoF_3$ at a temperature ranging from preferably 150 to 250° C. for periods ranging from 2 hours to 12 hours.

Replacement of the terminal iodine atom with chlorine may be accomplished by treating the cotelomer iodide with elemental chlorine at temperatures ranging from room temperature to 200° C. with or without ultraviolet light irradiation.

The cotelomers initially produced by the telomerization reaction described above, as well as those resulting from the replacement of the terminal iodine atom with fluorine or chlorine may be represented by the general formula:

$$R'[U]_m[CF_2CF_2]_nQ$$

or where the other olefin is $RCF=CF_2$ by the formula

where R, R', U, $n$ and $m$ are as previously defined and where Q is selected from the class consisting of iodine, fluorine and chlorine.

Another suitable procedure for converting the initial cotelomer iodides into more stable products is to subject the initial cotelomers to a coupling reaction in which two moles of cotelomer are coupled end to end by elimination of the terminal iodine atom between the two molecules. Thus two moles of cotelomer iodide

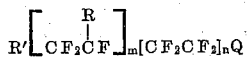

may be coupled by the use of ultraviolet light in the presence of mercury in accordance with the following reaction:

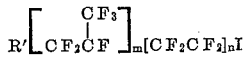

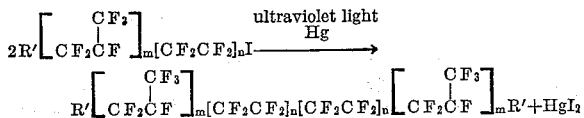

The techniques for carrying out such coupling reactions are described in detail in the copending application of R. N. Haszeldine, Serial No. 526,087, filed August 2, 1955, now abandoned. Where mixtures of cotelomers are coupled having varying $n$ and $m$ values, the value of $n$ and $m$ in each half of the coupled cotelomer will, of course, vary at random. Where mixture of cotelomers having different end groups are coupled, the values for R' may be also different in the individual coupled compounds.

The invention is illustrated by the following examples:

Example 1

To a 300 cc. Monel autoclave containing 156 grams (0.499 mole) of 1 - chloro - 2-iodoperfluoropropane ($CF_2ClCFICF_3$) while evacuated and cooled in liquid nitrogen, there is admitted by gaseous transfer in vacuo 50 grams (0.50 mole) of tetrafluoroethylene and 37.5 grams (0.250 mole) of perfluoropropene (the molar ratio of $CF_2=CF_2:CF_3CF=CF_2:CF_2ClCFICF_3$ equals 2:1:2). The autoclave is sealed and heated at 190 to 220° C. for about 5 hours while shaking. During this time the pressure drops from 800 to 400 lbs./in.² gage. From this reaction there is recovered 40 grams of unreacted olefins (mostly perfluoropropene). After recovery of unreacted $CF_2ClCFICF_3$, there is recovered approximately 50 grams of cotelomer product having the formula

The overall $n:m$ ratio is of the order of 6:1, and the $n+m$ value ranges mostly from 3 to 8. Upon fractional distillation of this cotelomer product, the following fractions are obtained:

(a) 7 grams (15 weight percent) of a liquid having a boiling range of 30° to 42° C. at about 0.1 mm. Hg.

(b) 16 grams (35 weight percent) of a liquid having a boiling point of 42° to 43° C. at about 0.1 mm. Hg.

(c) 6 grams (13 weight percent) of a liquid having a boiling range of 43° to 57° C. at about 0.1 mm. Hg.

(d) 6 grams (13 weight percent) of a liquid having a boiling range of 57° to 69° C. at about 0.1 mm. Hg.

(e) 11 grams of an undistilled residue which is solid at room temperature.

Example 2

To a 300 cc. Monel autoclave containing 78 grams (0.249 mole) of $CF_2ClCFICF_3$, while evacuated and cooled in liquid nitrogen, there is admitted by gaseous transfer in vacuo 75 grams (0.50 mole) of $CF_3CF=CF_2$ and 49.5 grams (0.495 mole) of $CF_2=CF_2$ (the molar ratio of $$CF_2=CF_2:CF_3CF=CF_2:CF_2ClCFICF_3 \text{ equals } 2:2:1)$$

The autoclave is sealed and heated at 190° to 220° C. for about 5 hours while shaking. The pressure drops from 1100 to 900 lbs./in.² gage during this time, most of the drop occurring during the first 3 hours. There is recovered from the reaction 60 grams of unreacted olefins (mostly perfluoropropene). The liquid products recovered from the autoclave, after recovery of unreacted $CF_2ClCFICF_3$, consist of telomer iodides of the formula

in which the value of $n+m$ ranges from about 3 to 12 and in which the overall $n:m$ ratio is of the order of 4:1. Upon fractional distillation of these cotelomer iodides in a small Vigreux still, the following fractions are obtained:

(a) 14 grams (32 weight percent) of a liquid having a boiling range of 36° to 52° C. at about 0.1 mm. Hg in which the value of $n+m$ is mostly 3 to 4.

(b) 6.5 grams (15 weight percent) of a liquid having a boiling range of 52° to 62° C. at about 0.1 mm. Hg in which value of $n+m$ is mostly about 4 to 5.

(c) 7 grams (16 weight percent) of a liquid having a boiling range of 62° to 82° C. at about 0.1 mm. Hg in which the value of $n+m$ is mostly about 5 to 6.

(d) 3 grams (7 weight percent) of a liquid having a boiling range of from 82° to 89° C. at about 0.1 mm. Hg in which the average value of $n+m$ is about 6.5.

(e) A residue of 14 grams, mainly solids, remains undistilled.

Example 3

Cotelomer iodides corresponding to fractions (c) and (d) of Example 2 are chlorinated by passing elemental chlorine through the iodide in a glass tube for 5 hours at a temperature of 170° C. The reaction is accompanied by the evolution of iodine chlorides mainly iodine monochloride which distills off at the reaction temperature. The cotelomer chlorides

in which the average value of $n+m$ is about 6 are obtained.

Example 4

Cotelomer iodides corresponding to fraction (c) and (d) of Example 2 are fluorinated by treatment with $CoF_3$ at 150° to 250° C. for several hours. The fluorinated product consists of cotelomers of the formula $$CF_2ClCF(CF_3)[CF_2CF(CF_3)]_m[CF_2CF_2]_nF$$

in which the average value of $n+m$ is mostly about 6, a viscous oil suitable as a lubricant, hydraulic fluid, or the like where high thermal and chemical stability are desired.

Example 5

To a 300 cc. Monel metal autoclave containing 59 grams (0.2 mole) of $C_2ClCCl_2I$, while evacuated and cooled in liquid nitrogen, there is admitted by gaseous transfer in vacuo 60 grams (0.6 mole) of $CF_2=CF_2$ and 90 grams (0.6 mole) of $CF_3CF=CF_2$ (the molar ratio of $$CF_2=CF_2:CF_3CF=CF_2:CF_2ClCCl_2I \text{ equals } 3:3:1)$$

The autoclave is sealed and heated at 140° to 145° C. for 5 hours while shaking. The pressure drops from 1000 to 600 lbs./in.² gage during this time.

On venting the autoclave there is recovered 98 grams of total volatiles including perfluoropropene, tetrachloroethylene and a small amount of the dimer of tetrafluoroethylene, i.e., $C_4F_8$. The liquid product in the autoclave consists of cotelomer iodides of the formula $$CF_2ClCCl_2[CF_2CF(CF_3)]_m[CF_2CF_2]_nI$$

in which the value of $n+m$ ranges from about 2 to 10. The molar ratio of tetrafluoroethylene to perfluoropropene in the cotelomer is about 4:1 based on the olefin usage ratio.

The 90 grams of liquid product is distilled in a small Vigreux distillation unit under reduced pressure and the following fractions are recovered:

(a) 18 grams of a liquid boiling up to 32° C. at about 0.1 mm. Hg consisting mostly of $CF_2ClCCl_2(CF_2CF_2)I$.

(b) 21.5 grams of a liquid having a boiling range of 32° to 37° C. at about 0.1 mm. Hg having a refractive index $n_D{}^{24}$ 1.4335 containing some cotelomer of the above formula where $n$ equals 1 and $m$ equals 1 and some where $n$ equals 2 and $m$ equals 1.

(c) 26.5 grams of a liquid having a boiling range of 37° to 47° C. at about 0.1 mm. Hg and having a refractive index $n_D{}^{24}$ 1.4161 in which the average value of $n+m$ is about 3.5.

(d) 11.5 grams of a liquid having a boiling range of 47° to 68° C. at about 0.1 mm. Hg and having a refractive index $n_D{}^{24}$ 1.3958 in which the average value of $n+m$ is about 4.5.

(e) 3 grams of a liquid boiling between 68° and 83° C. at about 0.1 mm. Hg having a refractive index $n_D{}^{24}$ 1.3584 in which the average value of $n+m$ is about 6.

(f) 9 grams of a residue of white solid in which the average value of $n+m$ is about 8 and containing cotelomers in which the value of $n+m$ ranges up to about 10.

*Example 6*

Cotelomer iodides corresponding to fraction (e) of Example 5 are treated with an excess of $SbF_5$ at 140° C. for about six hours. The fluorinated product consists of a mixture of cotelomer fluorides in which the original $CF_2ClCCl_2$— end group is fluorinated in varying degrees including mostly cotelomers of the formula $$CF_2ClCFCl[CF_2CF(CF_3)]_m[CF_2CF_2]_nF$$

and those of the formula $$CF_3CFCl[CF_2CF(CF_3)]_m[CF_2CF_2]_nF$$

where the average value of $n+m$ is about 6.

*Example 7*

The telogen iodide employed for this reaction, perfluoroisopropyl iodide $CF_3CFICF_3$ is prepared as follows. A mixture of 56 grams (0.442 gram atoms) of iodine, 24 grams (0.108 mole) of distilled iodine pentafluoride, 2 grams (0.074 gram atoms) of aluminum shavings of 99.99% purity and 2 grams (0.0049 mole) of aluminum iodide is heated in a nitrogen atmosphere in a 300 cc. Monel metal autoclave while shaking at 142° to 150° C. for 1¾ hours. The autoclave is cooled to room temperature, further cooled in solid carbon dioxide, evacuated, and charged by vacuum gaseous transfer with 114 grams (0.76 mole) of perfluoropropene $CF_3CF=CF_2$. The autoclave is then sealed and heated while shaking at 125° C. for a total of 7 hours. There is recovered from this reaction 40 grams of unreacted perfluoropropene by condensation in a refrigerated receiver upon venting the autoclave. The remaining reaction product is worked up by hydrolysis in iced, saturated sodium bisulfite solution made basic with sodium hydroxide followed by neutralization with an additional sodium hydroxide. The lower organic layer is separated, dried with anhydrous calcium sulfate, and analyzed by vapor-liquid-partition-chromatography. There is thus obtained 122 grams (77% conversion based on maximum theoretical iodine monofluoride available in the reaction mixture) of perfluoroisopropyl iodide $CF_3CFICF_3$, having a boiling point of 40° C. and a refractive index $n_D{}^{20}$ 1.327 and shown by vapor-liquid-partition-chromatography to be the exclusive isomeric product. Using a Perkin Elmer 2 meter "B" column operating at 30° C. under a pressure of helium of 30 lbs./in.² gage for carrying out the chromatographic analysis, the elution times for air and $CF_3CFICF_3$ are 0.6 minute and 8.7 minutes respectively. The infrared spectrum of $CF_3CFICF_3$ (vapor) has the following absorption bands: 7.31 (weak), 7.78 (very strong), 8.05 (very strong), 8.50 (strong), 8.92 (very strong), 10.45 (very strong), 11.08 (very strong), 13.34 (strong) and 14.07 (strong) microns; only the 8.05 and 13.34 $\mu$ bands are common to the vapor infrared spectrum for normal propyl iodide $CF_3CF_2CF_2I$. The absorption maximum of $CF_3CFICF_3$ in the ultraviolet spectrum taken in isooctane is at 276 m$\mu$.

Analysis of $CF_3CFICF_3$: Calculated for: $C_3F_7I$: C, 12.17; I, 42.88. Found: C, 11.99; I, 42.44.

To a 300 cc. Monel autoclave containing 59 grams (0.2 mole) of perfluoroisopropyl iodide (prepared as described above) while evacuated and cooled in liquid nitrogen, there is admitted by gaseous transfer in vacuo 40 grams (0.4 mole) of tetrafluoroethylene and 180 grams (1.2 moles) of perfluoropropene (the molar ratio of $$CF_2=CF_2:CF_3CF=CF_2:CF_3CFICF_3 \text{ equals } 2:6:1)$$

The autoclave is sealed and heated at 200° C. for 20 hours with shaking after which it is cooled and vented and the unreacted olefin is recovered. The product consists mostly of liquid cotelomers of the formula $$CF_3CF(CF_3)[CF_2CF(CF_3)]_m[CF_2CF_2]_nI$$

in which the value of $n+m$ ranges from about 4 to 20. The over-all average ratio of tetrafluoroethylene to perfluoropropene units in the cotelomer chain is of the order of 1:2.

*Example 8*

Cotelomer iodides prepared in accordance with Example 7 in which the average value of $n+m$ is about 7 are fluorinated by treatment with $CoF_3$ at 150°–250° C. for several hours. The resulting products are perfluorocotelomer fluorides of the formula $$CF_3CF(CF_3)[CF_2CF(CF_3)]_m[CF_2CF_2]_nF$$

in which the average value of $n+m$ is about 7. This perfluorinated oil has excellent thermal and chemical stability and is useful as a lubricant, hydraulic fluid, damping fluid, and the like in applications involving exposure to relatively high temperatures and reactive chemicals, e.g. liquid oxygen, strong acids and bases etc. Cotelomer fluorides of this type have very low surface tension, namely surface tensions of the order of 17 to 20 dynes per centimeter and likewise have excellent dielectric properties at low and high frequencies. At frequencies ranging from $10^2$ to $10^5$ cycles/second these cotelomer products display dielectric constants of the order of K=1.9–2.0 and loss factors of the order of tan $\delta$=.00002 to .0005.

*Example 9*

This example illustrates the relative ease with which the cotelomer iodides prepared in accordance with Examples 1 and 2, having predominantly —$CF_2CF_2I$ end groups are converted into derivatives such as acids, esters and the like in contrast to homotelomers of perfluoropropene and similar olefins which terminate in a secondary $$-\overset{CF_3}{\underset{|}{C}}FI \text{ group}$$

Cotelomer iodides corresponding to fraction (c) of Example 2 having the approximate formula $$CF_2ClCF(CF_3)[CF_2CF(CF_3)]_m[CF_2CF_2]_nI$$

where the average value of $n$ and $m$ is 4 and 2 respectively, is reacted with an excess of chlorosulfonic acid at a temperature of 150° C. for about 20 hours with shaking. After separation from excess chlorosulfonic acid by washing with ice water the product is dried, this being the chlorosulfate $$CF_2ClCF(CF_3)[CF_2CF(CF_3)]_m[CF_2CF_2]_nOSO_2Cl$$

where the average value of $n$ and $m$ is 4 and 2 respectively. The yield of the chlorosulfate based on starting iodide is approximately 80%.

This chlorosulfate is hydrolyzed by refluxing with 20% aqueous sodium hydroxide solution for several hours. The aqueous solution is decanted and the remaining waxy solid is washed several times with water. The chlorosulfate is converted quantitatively into the carboxylic acid sodium salt:

$$CF_2ClCF(CF_3)[CF_2CF(CF_3)]_m[CF_2CF_2]_nCF_2\overset{O}{\underset{\|}{C}}ONa$$

in which the average value of $n$ is about 3 and the average value of $m$ is about 2.

In contrast, the secondary iodide $$CF_3CF_2CF_2\left[\overset{CF_3}{\underset{|}{CF_2CF}}\right]I$$

prepared by the addition of perfluoropropene to the iodide $CF_3CF_2CF_2I$ when reacted with chlorosulfonic acid gives less than 10% yield of the secondary chlorosulfate $$CF_3CF_2CF_2CF_2\overset{OSO_2Cl}{\underset{|}{C}F}CF_3$$

This chlorosulfate yields on basic hydrolysis the perfluoro carboxylic acid $C_4F_9COOH$. The over-all yield, however, of carboxylic acid based on starting iodide is less than 5%.

This application is a continuation-in-part of our copending application Serial No. 735,702, filed May 16, 1958 for "Halogenated Organic Compounds."

We claim:

1. Cotelomers of the formula $$R'\left[\overset{R}{\underset{|}{CF_2CF}}\right]_m[CF_2CF_2]_nQ$$

where R' is selected from the class consisting of perfluoroalkyl and perfluorochloroalkyl radicals having from 1 to 6 carbon atoms; where R is a perfluoroalkyl radical having from 1 to 4 carbon atoms; where Q is selected from the class consisting of iodine, chlorine and fluorine, and where $n$ and $m$ are integers, the value of $n+m$ being in the range of from 3 to 40 and the ratio nof $n:m$ being in the range of from 7:1 to 1:4.

2. Cotelomers in accordance with claim 1 in which the $n:m$ ratio is in the range of from 5:1 to 1:2.

3. Cotelomers in accordance with claim 2 in which R' is a perfluoroalkyl radical.

4. Cotelomers of the formula $$R'\left[\overset{CF_3}{\underset{|}{CF_2CF}}\right]_m[CF_2CF_2]_nQ$$

where R' is selected from the class consisting of perfluroroalkyl and perfluorochloroalkyl radicals having from 1 to 6 carbon atoms; where Q is selected from the class consisting of iodine, chlorine and fluorine; and where $n$ and $m$ are integers, the value of $n+m$ being in the range of from 3 to 40 and the ratio of $n:m$ being in the range of from 5:1 to 1:2.

5. Cotelomers in accordance with claim 4 in which R' is a perfluoroalkyl radical.

6. Cotelomers of the formula $$CF_2ClCF(CF_3)\left[\overset{CF_3}{\underset{|}{CF_2CF}}\right]_m[CF_2CF_2]_nQ$$

where Q is selected from the class consisting of iodine, chlorine and fluorine; and where $n$ and $m$ are integers, the value of $n+m$ being in the range of from 3 to 40 and the ratio of $n:m$ being in the range of from 5:1 to 1:2.

7. Cotelomers of the formula $$CF_2ClCCl_2\left[\overset{CF_3}{\underset{|}{CF_2CF}}\right]_m[CF_2CF_2]_nQ$$

where Q is selected from the class consisting of iodine, chlorine and fluorine; and where $n$ and $m$ are integers, the value of $n+m$ being in the range of from 3 to 40 and the ratio of $n:m$ being in the range of from 5:1 to 1:2.

8. Cotelomers of the formula $$CF_3CF(CF_3)\left[\overset{CF_3}{\underset{|}{CF_2CF}}\right]_m[CF_2CF_2]_nQ$$

where Q is selected from the class consisting of iodine, chlorine and fluorine; and $n$ and $m$ are integers, the value of $n+m$ being in the range of from 3 to 40 and the ratio of $n:m$ being in the range of from 5:1 to 1:2.

9. Normally liquid cotelomer oils consisting predominantly of cotelomers of the formula $$R'\left[\overset{R}{\underset{|}{CF_2CF}}\right]_m[CF_2CF_2]_nQ$$

where R' is selected from the class consisting of perfluoroalkyl and perfluorochloroalkyl radicals having from 1 to 6 carbon atoms; where R is a perfluoroalkyl radical having from 1 to 4 carbon atoms; where Q is selected from the class consisting of fluorine and chlorine; and where $n$ and $m$ are integers, the value of $n+m$ being in the range of from 4 to 12 and the ratio of $n:m$ being in the range of from 7:1 to 1:4.

10. Cotelomer oils in accordance with claim 9 in which R is a perfluoroalkyl radical.

References Cited in the file of this patent

UNITED STATES PATENTS

| | | |
|---|---|---|
| 2,705,706 | Dittman et al. | Apr. 5, 1955 |
| 2,770,659 | Barnhart | Nov. 13, 1956 |
| 2,786,827 | Barnhart | Mar. 26, 1957 |
| 2,856,440 | Wolff | Oct. 14, 1958 |
| 2,875,253 | Barnhart | Feb. 24, 1959 |
| 2,880,247 | Miller | Mar. 31, 1959 |
| 2,884,466 | Hauptschein et al. | Apr. 28, 1959 |

OTHER REFERENCES

Hauptschein et al.: Jour. Am. Chem. Soc., vol. 79, pp. 2542–53, May 20, 1957.